(12) United States Patent
Petrus et al.

(10) Patent No.: US 11,363,553 B2
(45) Date of Patent: *Jun. 14, 2022

(54) IDENTIFYING A SYNCHRONIZATION MASTER FOR RADIO NODES

(71) Applicant: ARRIS Enterprises LLC, Suwanee, GA (US)

(72) Inventors: Paul Petrus, San Jose, CA (US); Yves Eteve, Livermore, CA (US); Rajiv Gupta, Gurgaon (IN); Shailender Potharaju, Fremont, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 185 days.

This patent is subject to a terminal disclaimer.

(21) Appl. No.: 16/897,553

(22) Filed: Jun. 10, 2020

(65) Prior Publication Data

US 2020/0305105 A1  Sep. 24, 2020

Related U.S. Application Data

(63) Continuation of application No. 16/026,012, filed on Jul. 2, 2018, now Pat. No. 10,721,698.

(Continued)

(51) Int. Cl.
*H04W 56/00* (2009.01)
*H04W 24/10* (2009.01)
(Continued)

(52) U.S. Cl.
CPC ....... *H04W 56/0015* (2013.01); *H04W 24/10* (2013.01); *H04B 7/2693* (2013.01); *H04B 7/2696* (2013.01); *H04L 7/0008* (2013.01)

(58) Field of Classification Search
CPC ............. H04W 24/10; H04W 56/0015; H04W 56/0025; H04B 7/2693; H04B 7/2696;
(Continued)

(56) References Cited

U.S. PATENT DOCUMENTS 3,798,650 A    3/1974  McComas et al.
7,441,003 B1 * 10/2008  Takeda ............... H04L 51/28
                                                709/206

(Continued)

FOREIGN PATENT DOCUMENTS

CN    104185274         12/2014
CN    104185274 A       12/2014

(Continued)

OTHER PUBLICATIONS

International Search Report and Written Opinion for International Patent Application No. PCT/US2015/068186 (dated Sep. 29, 2016).

(Continued)

*Primary Examiner* — Dung B Huynh
(74) *Attorney, Agent, or Firm* — Steven Stupp; Stewart Wiener (57) ABSTRACT

A radio node may calculate one or more performance metrics based on measured satellite signals, which are associated with a global positioning system, or wireless signals that are associated with a cellular-telephone network. Then, the radio node may determine, based on the one or more performance metrics, whether the radio node is a synchronization master in a cluster of radio nodes. When the radio node is the synchronization master, the radio node may provide information intended for a computer specifying that the radio node is the synchronization master and the one or more performance metrics. In response, the radio node may receive a synchronization request associated with another radio node in the cluster. Furthermore, the radio node may provide the synchronization information intended for the other radio node, where the synchronization information specifies time, frequency, and phase synchronization for at least the cluster.

20 Claims, 4 Drawing Sheets

Related U.S. Application Data (60) Provisional application No. 62/528,068, filed on Jul. 1, 2017.

(51) Int. Cl.
   *H04L 7/00* (2006.01)
   *H04B 7/26* (2006.01)

(58) Field of Classification Search
   CPC ..... H04L 7/0008; H04J 3/0641; H04J 3/0644; H04J 3/0682
   See application file for complete search history.

(56) References Cited

U.S. PATENT DOCUMENTS

| | | |
|---|---|---|
| 8,694,248 B1 | 4/2014 | Arbuckle et al. |
| 9,565,646 B1 | 2/2017 | Pearson et al. |
| 10,028,323 B1* | 7/2018 | Marupaduga ..... H04W 72/1252 |
| 2005/0212700 A1 | 6/2005 | Diggelen et al. |
| 2005/0198396 A1 | 9/2005 | Horne et al. |
| 2005/0207375 A1 | 9/2005 | Schiff |
| 2007/0238456 A1 | 10/2007 | Robins |
| 2008/0240072 A1 | 10/2008 | Bykovnikov |
| 2009/0067403 A1* | 3/2009 | Chan ..................... H04W 16/10 |
| | | 370/310 |
| 2009/0290572 A1 | 11/2009 | Gonia et al. |
| 2010/0245172 A1* | 9/2010 | Gottifredi ............ H04B 7/2693 |
| | | 342/450 |
| 2011/0216660 A1 | 9/2011 | Lee |
| 2012/0069943 A1 | 3/2012 | Lim et al. |
| 2012/0252503 A1 | 10/2012 | Wu |
| 2013/0136025 A1* | 5/2013 | Li ......................... H04W 28/08 |
| | | 370/252 |
| 2013/0166644 A1* | 6/2013 | Sun ....................... H04L 5/0035 |
| | | 709/204 |
| 2013/0185373 A1* | 7/2013 | Vandwalle ........... H04L 67/104 |
| | | 709/208 |
| 2013/0279483 A1 | 10/2013 | Ishihara et al. |
| 2013/0336341 A1 | 12/2013 | Kamada |
| 2014/0307727 A1 | 10/2014 | Cha et al. |
| 2015/0036540 A1 | 2/2015 | Kasslin et al. |
| 2015/0139199 A1 | 5/2015 | Pfeifer et al. |
| 2015/0146713 A1 | 5/2015 | Yang |
| 2015/0188767 A1* | 7/2015 | Li ......................... H04L 41/042 |
| | | 370/254 |
| 2015/0215879 A1 | 7/2015 | Zhu et al. |
| 2015/0362596 A1 | 12/2015 | Nozaki |
| 2016/0277138 A1 | 9/2016 | Garg et al. |
| 2017/0195982 A1 | 7/2017 | Park et al. |
| 2017/0208559 A1 | 7/2017 | Tamura |
| 2017/0280329 A1* | 9/2017 | Sun ......................... H04W 92/20 |
| 2018/0152286 A1 | 5/2018 | Kemparaj et al. |
| 2018/0234765 A1 | 8/2018 | Torok et al. |
| 2018/0249432 A1 | 8/2018 | Kurian et al. |
| 2018/0331891 A1* | 11/2018 | Zhao ....................... H04L 67/34 |
| 2019/0007919 A1 | 1/2019 | Petrus et al. |
| 2019/0089716 A1 | 3/2019 | Stöcker |
| 2019/0124611 A1 | 4/2019 | Pang et al. |
| 2019/0239181 A1* | 8/2019 | Gangakhedkar ...... H04W 64/00 |
| 2019/0386716 A1* | 12/2019 | Uchida ................ H04B 7/0617 |
| 2020/0059849 A1* | 2/2020 | Bencheikh ............ H04W 40/22 |
| 2020/0359453 A1* | 11/2020 | Jiang ....................... H04L 45/48 |

FOREIGN PATENT DOCUMENTS

| | | |
|---|---|---|
| EP | 2073403 | 6/2009 |
| EP | 2722718 | 4/2014 |
| KR | 10-2010-0114350 | 10/2010 |
| KR | 10-2010-0114350 A | 10/2010 |
| WO | 2012161398 | 11/2012 |

OTHER PUBLICATIONS

Yoon et al. "Wireless Network Synchronization Algorithm Based on IEEE 802.11 WLANs (Wireless Local Area 2 Networks) for Multimedia Services" Journal of the Korea Society of Computer and Information, 13(6):225-232 (2008).

European Patent Appl. No. 120166669.0, Search Report, dated Sep. 11, 2020.

PCT International Search Report & Written Opinion, Re: Application No. PCT/US2015/068186, dated Sep. 29, 2016.

J.W. Yoon, et al., "Wireless Network Synchronization Algorithm Based on IEEE 802.11 WLANs (Wireless Local Area Networks) for Multimedia Services", Journal of the Korea Society of Computer and Information (vol. 13, Issue 6), pp. 225-232, Nov. 30, 2008.

\* cited by examiner

IDENTIFYING A SYNCHRONIZATION MASTER FOR RADIO NODES

CROSS REFERENCE TO RELATED APPLICATIONS

This application is a continuation of U.S. patent application Ser. No. 16/026,012 (now issued as U.S. patent Ser. No. 10/721,698), "Identifying a Synchronization Master for Radio Nodes," by Paul Petrus, Yves Eteve, Rajiv Gupta and Shailender Potharaju, filed on Jul. 2, 2018, and claims priority under 35 U.S.C. 119(e) to U.S. Provisional Patent Application No. 62/528,068, "Identifying a Synchronization Master for Radio Nodes," by Paul Petrus, Yves Eteve, Rajiv Gupta and Shailender Potharaju, filed on Jul. 1, 2017, the contents of both of which are herein incorporated by reference.

BACKGROUND

Field

The described embodiments relate to techniques for communicating information among electronic devices. In particular, the described embodiments relate to techniques for determining a synchronization master that synchronizes radio nodes.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Washington), and/or another type of wireless network.

While many electronic devices communicate with each other via large networks owned by a network operator, it is often difficult to communicate via a cellular-telephone network, e.g., in indoor environments. In particular, in indoor environments the network performance (such as the block error rate and the capacity) of the cellular-telephone network can be degraded or not available at all. Moreover, there are often constraints on the number of base stations (and associated cell towers) that implement so-called 'macrocells' in a cellular-telephone network. Consequently, it can be difficult for the operator of the cellular-telephone network to improve the quality of their service e.g., in indoor environments.

One approach for addressing this challenge is to implement so-called 'small cells,' which typically include radio access nodes that communicate using lower power than macrocells, and therefore provide smaller coverage areas than macrocells. Typically, in order for different small cells to effectively communicate with electronic devices (such as performing handovers, avoiding dropped calls, etc.), the small cells need to be synchronized with each other. Often, small cells can be synchronized by external devices or systems, such as using signals from a global positioning system or a neighboring macrocell. However, in environments where all the small cells cannot communicate with the external devices or systems, it can be difficult to synchronize small cells with each other.

SUMMARY

The described embodiments relate to a radio node that selectively provides synchronization information. This radio node includes one or more antenna nodes that can couple to an antenna and one or more wired nodes. Moreover, the radio node includes an interface circuit communicatively coupled to the one or more antenna nodes and the one or more wired nodes. During operation, the radio node measures, during a time interval, electrical signals corresponding to satellite signals, which are associated with a global positioning system, via the interface circuit, or measures, during the time interval, wireless signals that are associated with a cellular-telephone network via the interface circuit. Then, the radio node calculates one or more performance metrics based on the electrical signals. Next, the radio node determines, based on the one or more performance metrics, whether the radio node is a synchronization master in a cluster of radio nodes.

When the radio node is the synchronization master, the radio node provides, via the interface circuit, information to a computer specifying that the radio node is the synchronization master and the one or more performance metrics. In response, the radio node receives, via the interface circuit, a synchronization request associated with another radio node in the cluster. Furthermore, the radio node provides, via the interface circuit, the synchronization information intended for the other radio node, where the synchronization information specifies time (such as time of day), frequency, and phase synchronization for at least the cluster.

Note that the one or more performance metrics may include: an average received signal strength, a number of satellites from which the radio node receives the satellite signals, and/or a signal-to-noise ratio.

Moreover, the radio node may receive the synchronization request without the radio node notifying the other radio node that the radio node is the synchronization master for the other radio node. Alternatively or additionally, the radio node may receive the synchronization request without the radio node being configured with or provisioned with identifiers of the radio nodes in the cluster.

Furthermore, the radio node may be the synchronization master when: a number of satellites from which the radio node receives the satellite signals is greater than a first threshold value, and/or the signal-to-noise ratio is greater than a second threshold value.

Additionally, when the radio node is not the synchronization master, the radio node may receive, via the interface circuit, information associated with the computer specifying another synchronization master for the radio node and a backup synchronization master for the radio node, where the information includes network addresses of the other synchronization master and the backup synchronization master. Then, the radio node may provide, via the interface circuit, a second synchronization request for the other synchronization master. Next, the radio node may receive, via the interface circuit, second synchronization information intended for the radio node that is associated with the other synchronization master, wherein the second synchronization information specifies time, frequency, and phase synchronization for at least the radio node. When the other synchronization master is inactive, the radio node may: select the backup synchronization master; provide, via the interface circuit, a third synchronization request for the backup synchronization master; and receive, via the interface circuit, third synchronization information intended for the radio node that is associated with the backup synchronization master, wherein the third synchronization information specifies time, frequency, and phase synchronization for at least the radio node.

In some embodiments, the synchronization request and the synchronization information are communicated using wired communication.

Note that the synchronization request and the synchronization information may use a precision time protocol (PTP).

Moreover, the radio node may include an eNodeB, a Universal Mobile Telecommunications System (UMTS) NodeB and radio network controller (RNC), an NR gNB or gNodeB, etc.

Another embodiment provides a computer-readable storage medium with a program module for use with the radio node. When executed by the radio node, this program module causes the radio node to perform at least some of the aforementioned operations.

Another embodiment provides a method, which may be performed by the radio node. This method includes at least some of the aforementioned operations.

Another embodiment provides a computer that selects the synchronization master.

Another embodiment provides a computer-readable storage medium with a program module for use with the computer. When executed by the computer, this program module causes the computer to perform at least some of the aforementioned operations.

Another embodiment provides a method, which may be performed by the computer. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Table 1 provides frequency synchronization and start of radio frame phase synchronization requirements in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

A communication technique for synchronizing a radio node (such as an eNodeB) with other radio nodes in a cluster of radio nodes (such as a cluster of radio nodes in a cellular-telephone network) is described. In this communication technique, the radio node may calculate one or more performance metrics based on measured satellite signals, which are associated with a global positioning system, or measured wireless signals that are associated with a cellular-telephone network. Then, the radio node may determine, based on the one or more performance metrics, whether the radio node is a synchronization master in a cluster of radio nodes. When the radio node is the synchronization master, the radio node may provide information intended for a computer specifying that the radio node is the synchronization master and the one or more performance metrics. In response, the radio node may receive a synchronization request associated with another radio node in the cluster (i.e., the computer may determine that the radio node is the synchronization master for the other radio node). Furthermore, the radio node may provide the synchronization information intended for the other radio node, where the synchronization information specifies time (such as time of day), frequency, and phase synchronization for at least the cluster.

Alternatively, when the radio node is not the synchronization master, the radio node may receive information associated with the computer specifying another synchronization master for the radio node and a backup synchronization master for the radio node, where the information includes network addresses of the other synchronization master and the backup synchronization master. Subsequently, the radio node may provide a second synchronization request for the other synchronization master. Next, the radio node may receive second synchronization information intended for the radio node that is associated with the other synchronization master, where the second synchronization information specifies time of day, frequency, and phase synchronization for at least the radio node. When the other synchronization master is inactive, the radio node may: select the backup synchronization master; provide a third synchronization request for the backup synchronization master; and receive third synchronization information intended for the radio node that is associated with the backup synchronization master, where the third synchronization information specifies time of day, frequency, and phase synchronization for at least the radio node.

By facilitating selection of the synchronization master and the synchronization of the cluster of radio nodes, the communication technique may facilitate effective communication between the radio nodes and one or more electronic devices (such as cellular telephones). This capability may be useful when some or all of the radio nodes in the cluster are unable to receive signals from a global position system, such as when the cluster of radio nodes are located indoors or when they are synchronizing to different synchronization masters. Consequently, by facilitating improved communication with the electronic device, the communication technique may increase customer satisfaction and loyalty.

We now describe some embodiments of the communication technique. A cellular-telephone network may include base stations (and associated cell towers) that implement so-called 'macrocells.' These macrocells may facilitate communication with hundreds of users (such as hundreds of cellular telephones) over distances of kilometers. In general, the positioning of the cell towers (and the antennas) is carefully designed and optimized to maximize the performance of the cellular-telephone network (such as the throughput, the capacity, the block error rate, etc.) and to reduce crosstalk or interference between the signals transmitted by different cell towers and/or different macrocells. Small cells are generally radio access nodes providing lower power than macrocells and therefore providing smaller coverage areas than macrocells. It is common to subcategorize 'small cells' even further by ascribing relative general ranges. For example, a 'microcell' might have a range of less than 2 kilometers, a "picocell" less than 200 meters, and a 'femtocell' on the order of 10 meters. These descriptions are for general relative comparison purposes and should not be limiting on the scope of the disclosed embodiments of the communication technique.

However, there are often gaps in the coverage offered by macrocells. Consequently, some users operate local transceivers that provide short-range communication in the cellular-telephone network. These so-called 'femto cells' provide short-range communication (e.g., up to 10 m) for a few individuals.

In addition, larger organizations (such as those with 50-60 users, which is a non-limiting numerical example) may operate local transceivers that provide communication in the cellular-telephone network over a range of 100 m. This intermediate-range coverage in the cellular-telephone network can be typically referred to as a 'small cell' as well.

One challenge for operators of cellular-telephone networks is maintaining network performance and quality. For example, it may be difficult to maintain the network performance and the quality of service in high density, indoor or crowded environments. While the use of femto cells and/or small cells can mitigate this challenge, there are still often circumstances where the network performance and quality of a cellular-telephone network is degraded. In particular, as noted previously, proper communication between small cells and electronic devices (such as cellular telephones) typically requires synchronization of the small cells. However, in many communication environments it is difficult to synchronize the small cells. For example, it can be difficult to synchronize the small cells when at least some of the small cells are unable to receive signals with synchronization information from external devices (such as a neighboring macrocell) or systems (such as a global positioning system), such as when the small cells are located indoors or in an indoor venue (such as inside of a building). Moreover, the synchronization difficulty is often complicated by variation in the communication environment. These challenges are addressed in the communication technique described below.

In the discussion that follows, Long Term Evolution or LTE (from the 3rd Generation Partnership Project of Sophia Antipolis, Valbonne, France) is used as an illustration of a data communication protocol in a cellular-telephone network that is used during communication between one or more radio nodes and an electronic device. Consequently, eNodeBs or eNBs are used as illustrative examples of the radio nodes. However, a wide variety of communication techniques or protocols may be readily used for the various embodiments. For example, an electronic device and a radio node may communicate frames or packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), a cellular-telephone or data network (such as using a third generation or 3G communication protocol, a fourth generation or 4G communication protocol, e.g., LTE, LTE Advanced or LTE-A, a fifth generation or 5G communication protocol, or other present or future developed advanced cellular communication protocol) and/or another type of wireless interface (such as communication protocol). Thus, the radio nodes may include: an eNodeB, a UMTS NodeB and RNC, an NR gNB or gNodeB, etc.

Moreover, the radio may communicate with other radio nodes and/or computers in a network using a wired communication protocol, such as an IEEE 802.3 standard (which is sometimes referred to as 'Ethernet') and/or another type of wired interface. In the discussion that follows, Ethernet is used as an illustrative example.

Figure 1:
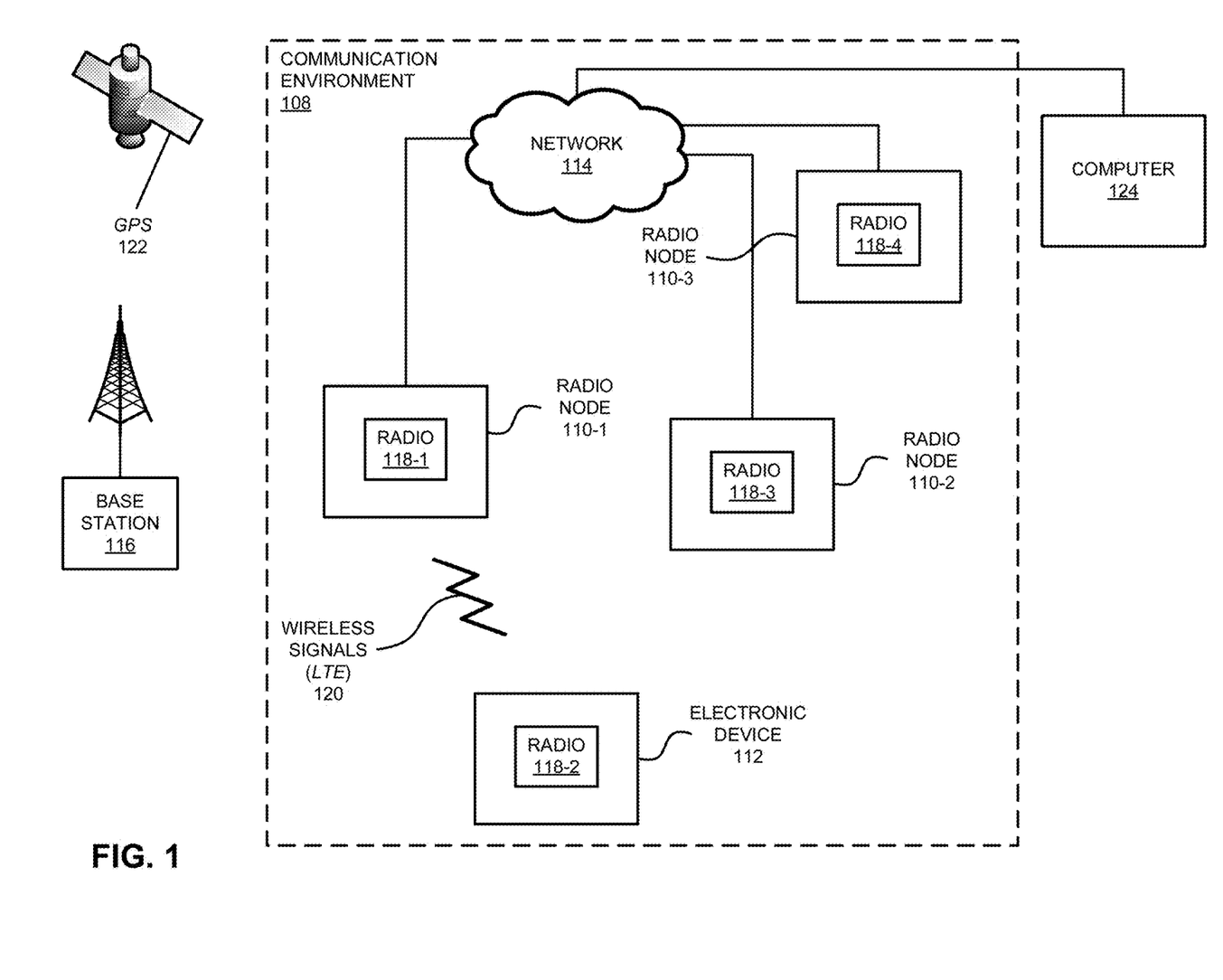
FIG. 1 is a block diagram illustrating an example of communication among a computer, radio nodes and electronic devices in a system in accordance with an embodiment of the present disclosure.

FIG. 1 presents a block diagram illustrating an example of communication among electronic devices according to some embodiments. In particular, radio nodes 110 (which are sometimes referred to as a 'cluster of radio nodes') can communicate LTE data frames or packets using LTE with an electronic device 112 (which is sometimes referred to as 'user equipment' or UE, such as a cellular telephone and, more generally, a portable electronic device). Again, LTE is used as an exemplary cellular protocol and the embodiments herein are not so limited. Moreover, radio nodes 110 may also communicate (via wireless or wired communication, such as Ethernet, in network 114) synchronization information with each other via another communication protocol, such as a precision time protocol or PTP (which is used as an illustrative example), and more generally a communication protocol that is compatible with an IEEE 1588-2002 standard. Note that PTP is a communication protocol that can be used to synchronize electronic devices. In the discussion that follows, 'PTP' refers to an approach for synchronizing, via Internet Protocol (IP), a set of electronic devices according to the IEEE 1588-2002 standard based on a global positioning system. However, in some embodiments the synchronization is based on a network listen to a macrocell in a cellular-telephone network or a local timing reference. (Although described in the context of PTP, other or future interfaces could be used, i.e., another interface or protocol for communicating synchronization information among radio nodes 110.)

Figure 2:
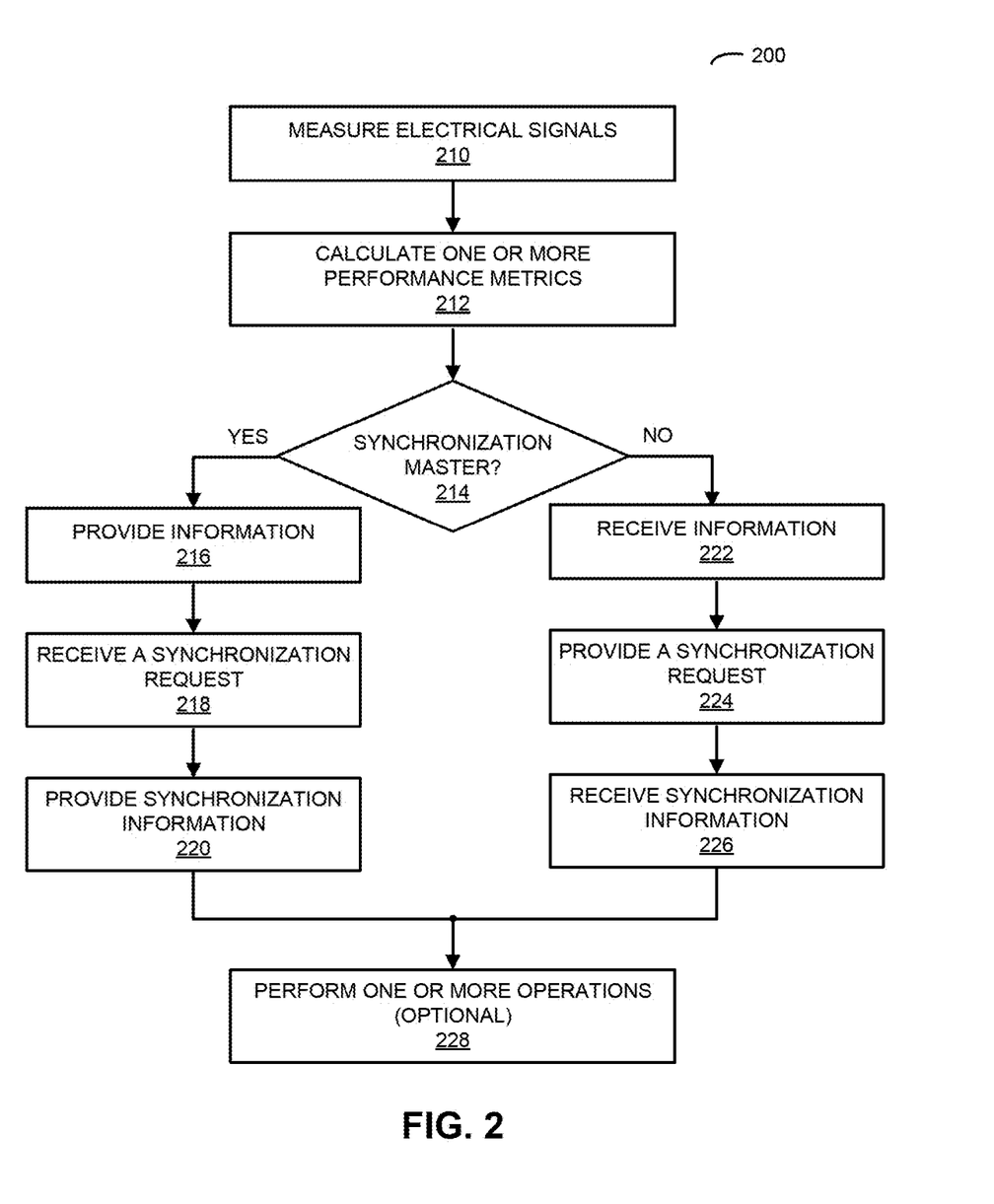
FIG. 2 is a flow diagram illustrating an example of a method for providing synchronization information in the system in FIG. 1 in accordance with an embodiment of the present disclosure.

In particular, as described further below with reference to FIGS. 2 and 3, each of radio nodes 110 may perform a communication technique by communicating with the other radio nodes 110 and computer 124 via network 114. Using radio node 110-1 as an example, this radio node may perform measurements during a time interval (such as a scan time of five minutes) of satellite signals from satellites in a global position system (GPS) 122. Then, radio node 110-1 may calculate one or more performance metrics based on the measured satellite signals. Moreover, radio node 110-1 may determine, based on the one or more performance metrics, whether the radio node is a synchronization master in the cluster of radio nodes 110. For example, the one or more performance metrics may include: an average received signal strength of the satellite signals, a number of satellites from which radio node 110-1 receives the satellite signals, and/or a signal-to-noise ratio of the received satellite signals. Furthermore, radio node 110-1 may determine that it is the synchronization master when: a received signal strength is greater than a value such as, e.g., −85 dBm), a number of satellites from which radio node 110-1 receives the satellite signals is greater than a first threshold value (such as a minimum of, e.g., three satellites), and/or the signal-to-noise ratio is greater than a second threshold value (such as, e.g., 12 dBm). However, these and other numerical values in this discussion are for illustrative purposes only and other numerical values may be used.

When radio node 110-1 is the synchronization master, radio node 110-1 may provide, via network 114, information intended for computer 124 specifying that radio node 110-1 is the synchronization master and the one or more performance metrics radio node 110-1 determined. After receiving the information and the one or more performance metrics, from radio node 110-1 and/or similar information from one or more of the other radio nodes 110, computer 124 may assign radio node 110-1 as the synchronization master for a subset (or a cluster) that includes one or more of the other radio nodes 110 (such as radio node 110-2). For example, computer 124 may select, based on the one or more performance metrics (such as the signal-to-noise ratio or an average signal-to-noise ratio) and network information (such as the number of radio nodes 110), the best synchronization master for the remaining radio nodes 110, which determined that they were not synchronization masters (i.e., that they are slaves). In some embodiments, a subset may include up to, e.g., 20 or 32 of the other radio nodes 110, such that, if there are more than 20 or 32 of radio nodes 110 that need a synchronization master, computer 124 may designate more than one synchronization master (such as, e.g., up to six synchronization masters), and then may randomly and approximately equally divide the radio nodes 110 in the subset among the multiple synchronization masters. However, these numerical values are used as an illustration and in other embodiments other values may be used, e.g., there may not be a limit to the number of radio nodes 110 assigned to a synchronization master. The use of multiple synchronization masters for load balancing may allow the communication technique to be scaled for use in larger venues. Moreover, in some embodiments instead of a synchronization master and its backup, a radio node may be assigned to at least a pair of synchronization masters. Thus, in some embodiments the communication technique performs load balancing of radio nodes 110 that are not synchronization masters (i.e., the slaves) and that are assigned to one or more synchronization masters.

Furthermore, computer 124 may provide, via network 114, information to radio node 110-2 that indicates that radio node 110-1 is the synchronization master for radio node 110-2. This information may include a network address (such as an Internet Protocol address) of radio node 110-1. In some embodiments, computer 124 communicates the information to radio node 110-2 using unicast. In response to receiving the information, radio node 110-2 may provide, via network 114, a synchronization request to radio node 110-1. Next, radio node 110-1 may provide, via network 114, the synchronization information intended for radio node 110-2, where the synchronization information specifies time of day, frequency, and phase synchronization for at least the subset. In particular, radio node 110-1 may specify time synchronization (such as the start of a frame), frequency synchronization (for the frequency range), and phase synchronization (so that slots are aligned) for radio node 110-2, and radio node 110-1 may have a predefined performance (such as a synchronization accuracy of at least ±1.5 µs and, more generally, a source quality), e.g., based on a type of communication environment 108 of radio nodes 110 (such as whether there is at least partial overlap among the wireless coverage of radio nodes 110 and with a neighboring macrocell, e.g., base station 116).

Note that the synchronization request and the synchronization information may use PTP. In particular, radio nodes 110-1 and 110-2 may exchange: an announce message, a synchronization message, a delay-request message and a delay-response message.

Thus, radio node 110-1 may receive the synchronization request from radio node 110-2 without radio node 110-1 notifying radio node 110-2 that radio node 110-1 is the synchronization master for radio node 110-2. Alternatively or additionally, radio node 110-1 may receive the synchronization request from radio node 110-2 without radio node 110-1 being configured with or provisioned by computer 124 (or manually) with an identifier of radio node 110-2 (and, more generally, the identifier of radio nodes in the subset). Consequently, the communication technique may facilitate synchronization of radio nodes 110 without arbitration among radio nodes 110 or manual configuration, which may simplify the selection of the synchronization master(s) and may reduce the communication overhead in network 114.

Alternatively, when radio node 110-1 determines that it is not the synchronization master, radio node 110-1 may take no further action (e.g., radio node 110-1 may not provide the information and the one or more performance metrics to computer 124). Instead, computer 124 may assign another of the radio nodes 110 as the synchronization master for radio node 110-1. For example, after receiving the information and the one or more performance metrics from radio node 110-3 which indicates that radio node 110-3 has determined that it is a synchronization master, computer 124 may assign radio node 110-3 as the synchronization master for radio node 110-1. Consequently, computer 124 may provide, via network 114, information to radio node 110-1 that indicates that radio node 110-3 is the synchronization master for radio node 110-1. This information may include a network address of radio node 110-3. Then, radio node 110-1 may provide, via network 114, a second synchronization request for radio node 110-3. Next, radio node 110-3 may provide, via network 114, second synchronization information intended for radio node 110-1, where the second synchronization information specifies time of day, frequency, and phase synchronization for at least radio node 110-1. Note that the second synchronization request and the second synchronization information may use PTP.

In some embodiments, in addition to providing information that specifies or indicates the synchronization master for a given radio node that has already determined that it is not a synchronization master, computer 124 may provide information specifying a backup synchronization master. This information may include a network address of the backup synchronization master. For example, computer 124 may specify that radio node 110-1 is the synchronization master for radio node 110-2, and that radio node 110-3 is the backup synchronization master for radio node 110-2. Then, when the other synchronization master is inactive (i.e., when radio node 110-1 is inactive), radio node 110-2 may: select the backup synchronization master (i.e., radio node 110-3); provide, via network 114, a third synchronization request for radio node 110-3; and receive, via network 114, third synchronization information intended for radio node 110-2 from radio node 110-3, where the third synchronization information specifies time of day, frequency, and phase synchronization for at least radio node 110-2. Once again, the third synchronization request and the third synchronization information may use PTP.

The aforementioned operations in the communication technique may be repeated so that radio nodes 110 can adapt to dynamic changes in communication environment 108. For example, the communication technique may be performed once (such as when radio nodes 110 are turned on), periodically (such as, e.g., every 50 ms), as needed (such as when the synchronization accuracy is degraded below a minimum threshold value) and/or continuously. Thus, a slave in one iteration of the communication technique may become a synchronization master in a subsequent iteration if the appropriate GPS signals are received. Consequently, in principle, any of radio nodes 110 can be a synchronization master.

In some embodiments, computer 124 may designate more than one synchronization master for a given slave, such as radio node 110-2. In these embodiments, radio node 110-2 may select the current best synchronization master as the active synchronization master, and the other designated synchronization masters may be used as backup synchronization masters. For example, radio node 110-1 may select the best synchronization master based on the clock classes and accuracies of the designated or assigned synchronization masters.

In this way, the communication technique may allow radio nodes 110 to determine if they are synchronization masters, and computer 124 may provide synchronization-master assignments to the remaining slaves. By facilitating selection of the synchronization master(s) and synchronization of radio nodes 110, the communication technique may facilitate effective communication between radio nodes 110 and one or more electronic devices (such as electronic device 112), even when some or all of radio nodes 110 are unable to receive signals from global position system 122. Thus, the communication technique may improve communication performance in a wide variety of types of communication environments, such as when radio nodes 110 are located indoors.

In general, the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

During the communication in FIG. 1, radio nodes 110 and electronic device 112 may wirelessly communicate while: transmitting access requests and receiving access responses on wireless channels, detecting one another by scanning wireless channels, establishing connections (for example, by transmitting connection requests and receiving connection responses), and/or transmitting and receiving frames that include packets (which may include information as payloads).

Figure 4:
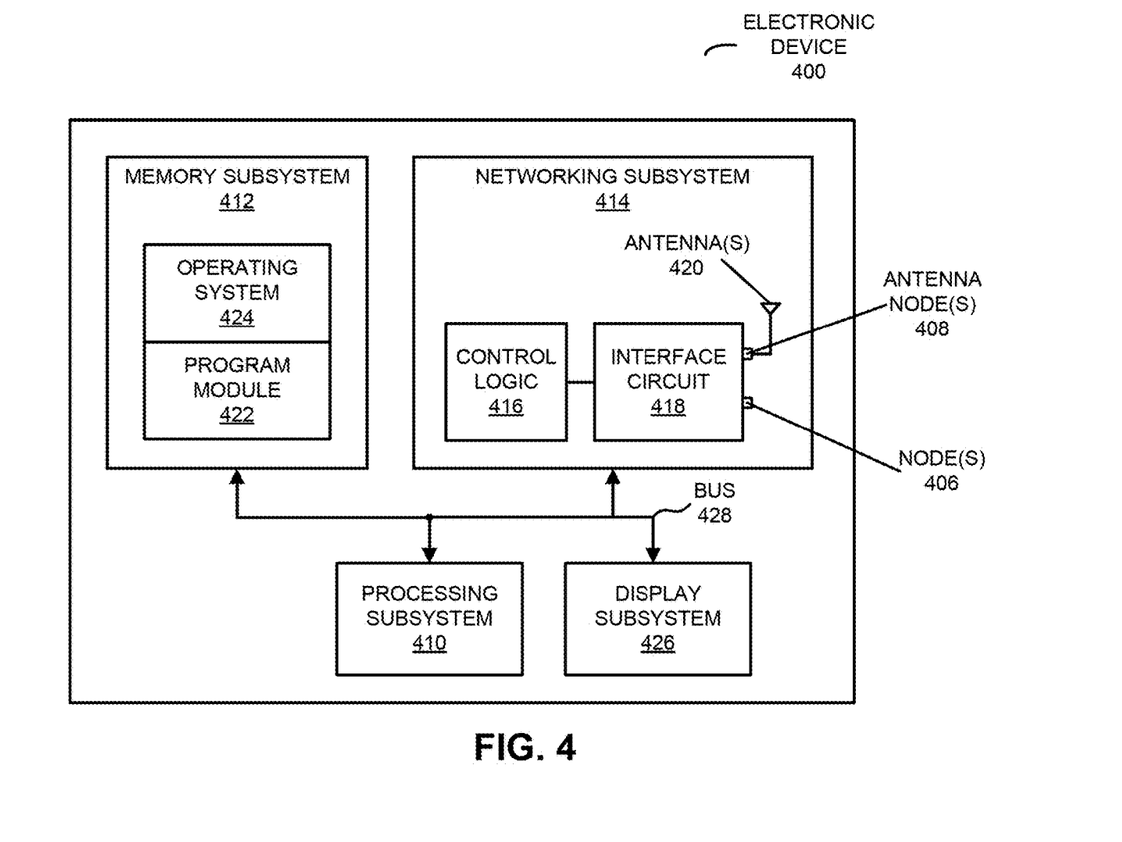
FIG. 4 is a block diagram illustrating an example of an electronic device in accordance with an embodiment of the present disclosure.

As described further below with reference to FIG. 4, radio nodes 110 and electronic device 112 may include subsystems, such as a networking subsystem, a memory subsystem and a processor subsystem. In addition, radio nodes 110 and electronic device 112 may include radios 118 in the networking subsystems. More generally, radio nodes 110 and electronic device 112 can include (or can be included within) any electronic devices with the networking subsystems that enable radio nodes 110 and electronic device 112 to wirelessly communicate with each other. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames that include packets via the connection, etc.

Moreover, as can be seen in FIG. 1, wireless signals 120 (represented by a jagged line) are transmitted by radios 118 in radio nodes 110 and electronic device 112. For example, radio 118-1 in radio node 110-1 may transmit information (such as frames that include packets) using wireless signals 120. These wireless signals are received by radios 118 in one or more other electronic devices (such as radio 118-2 in electronic device 112). This may allow radio node 110-1 to communicate information to other radio nodes 110 and/or electronic device 112. Note that wireless signals 120 may convey LTE frames or packets.

In the described embodiments, processing a frame that includes packets in radio nodes 110 and electronic device 112 may include: receiving the wireless signals with the frame; decoding/extracting the frame from the received wireless signals to acquire the frame; and processing the frame to determine information contained in the payload of the frame (such as the packet).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving frames that include packets.

We now describe embodiments of the method. FIG. 2 presents a flow diagram illustrating an example of a method 200 for providing synchronization information, which may be performed by a radio node (such as one of radio nodes 110 in FIG. 1). During operation, an interface circuit in the radio node may measures, during a time interval (such as, e.g., five minutes), electrical signals (operation 210) corresponding to satellite signals, which are associated with a global positioning system. Then, the radio node calculates one or more performance metrics (operation 212) based on the electrical signals. Note that the one or more performance metrics may include: an average received signal strength, a number of satellites from which the radio node receives the satellite signals, and/or a signal-to-noise ratio.

Next, the radio node determines, based on the one or more performance metrics, whether the radio node is a synchronization master (operation 214) in a cluster of radio nodes. For example, the radio node may be the synchronization master when: a number of satellites from which the radio node receives the satellite signals is greater than a first threshold value, and/or the signal-to-noise ratio is greater than a second threshold value.

When the radio node determines that it is the synchronization master (operation 214), the interface circuit in the radio node provides information (operation 216) for a computer specifying that the radio node is the synchronization master and the one or more performance metrics (operation 216). In response, the interface circuit in the radio node receives a synchronization request (operation 218) associated with another radio node in the cluster. Note that the radio node may receive the synchronization request without the radio node notifying the other radio node that the radio node is the synchronization master for the other radio node. Alternatively or additionally, the radio node may receive the synchronization request without the radio node being configured with or provisioned with identifiers of the radio nodes in the cluster. Furthermore, the interface circuit in the radio node provides the synchronization information (operation 220) for the other radio node, where the synchronization information specifies time of day, frequency, and phase synchronization for at least the cluster.

Note that the synchronization request and the synchronization information are communicated using wired communication. In some embodiments, the synchronization request and the synchronization information use PTP.

Alternatively, when the radio node determines that it is not the synchronization master (operation 214), the interface circuit in the radio node may receive information (operation 222) associated with the computer specifying another synchronization master for the radio node and a backup synchronization master for the radio node, where the information includes network addresses of the other synchronization master and the backup synchronization master. Then, the interface circuit in the radio node may provide a synchronization request (operation 224) for the other synchronization master. Next, the interface circuit in the radio node may receive synchronization information (operation 226) for the radio node that is associated with the other synchronization master, wherein the synchronization information specifies time of day, frequency, and phase synchronization for at least the radio node.

In some embodiments, the electronic device optionally performs one or more additional operations (operation 228). For example, when the other synchronization master is inactive, the radio node may: select the backup synchronization master; provide, via the interface circuit, another synchronization request for the backup synchronization master; and receive, via the interface circuit, additional synchronization information intended for the radio node that is associated with the backup synchronization master, wherein the additional synchronization information specifies time of day, frequency, and phase synchronization for at least the radio node.

In some embodiments of method 200, there may be additional or fewer operations. Furthermore, the order of the operations may be changed, and/or two or more operations may be combined into a single operation.

Figure 3:
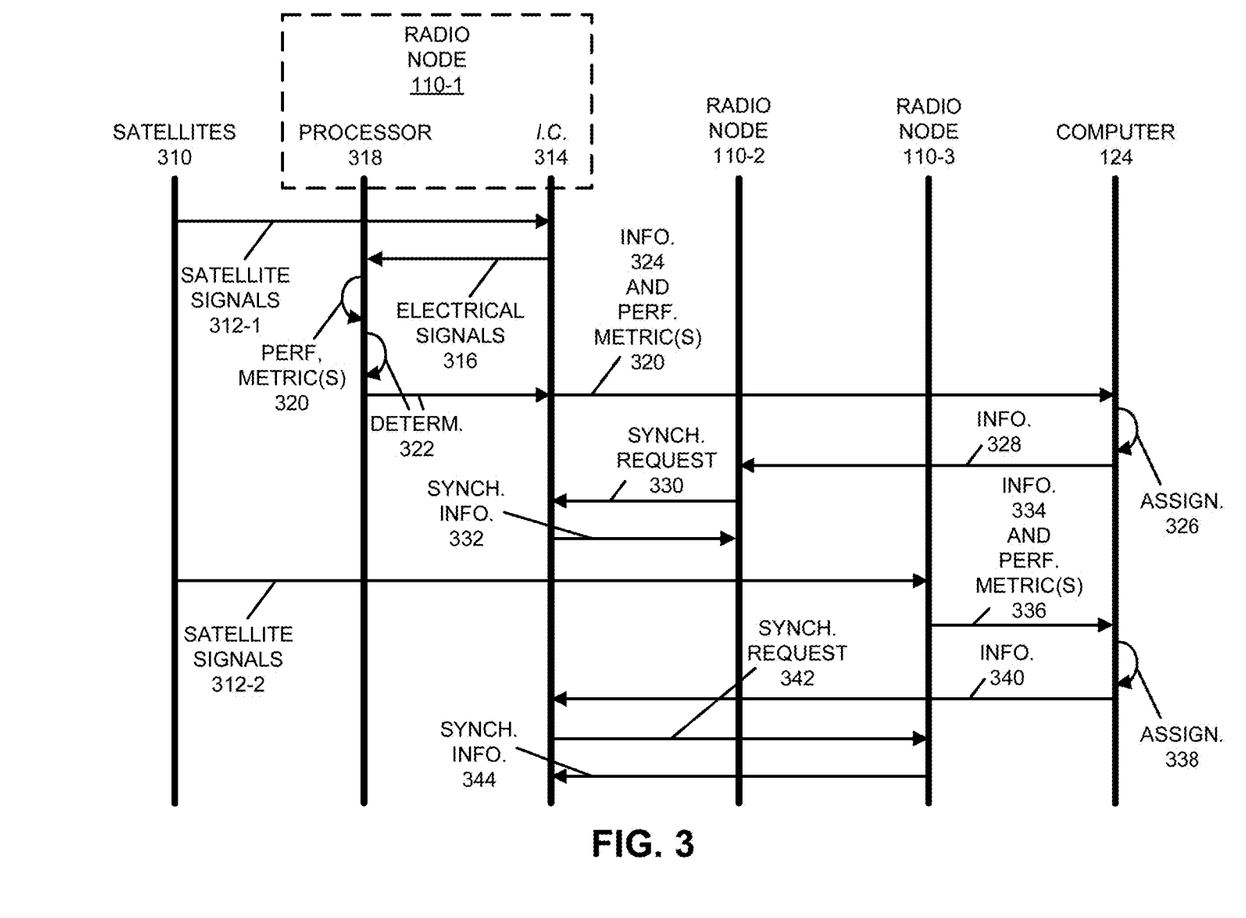
FIG. 3 is a drawing illustrating an example of communication among the electronic devices in FIG. 1 in accordance with an embodiment of the present disclosure.

Embodiments of the communication technique are further illustrated in FIG. 3, which presents a drawing illustrating an example of communication among satellites 310 in a global positioning system, radio node 110-1, radio node 110-2, radio node 110-3 and computer 124. In FIG. 3, an interface circuit (IC) 314 in radio node 110-1 may measure, during a time interval, electrical signals 316 corresponding to satellite signals 312-1 from satellites 310. Then, a processor 318 in radio node 110-1 calculates one or more performance metrics 320 based on electrical signals 316.

Next, processor 318 determines 322, based on the one or more performance metrics 320, whether radio node 110-1 is a synchronization master in a cluster of radio nodes 110.

When radio node 110-1 determines 322 that it is the synchronization master, interface circuit 314 provides information 324 for computer 124 specifying that radio node 110-1 is the synchronization master and the one or more performance metrics 320. Based on information 324, the one or more performance metrics 320 and/or network information (such as a number of radio nodes 110 that are slaves), computer 124 may assign 326 radio node 110-1 as the synchronization master for radio node 110-2. Next, computer 124 may provide information 328 that indicates or specifies the assignment to radio node 110-2, along with a network address of radio node 110-1. This information may be received by radio node 110-2.

Subsequently, radio node 110-2 provides a synchronization request 330 to radio node 110-1. After receiving synchronization request 330, interface circuit 314 may provide synchronization information 332 for radio node 110-2, where the synchronization information specifies time of day, frequency, and phase synchronization for at least the cluster.

Alternatively, when radio node 110-1 determines 322 that it is not the synchronization master, and after radio node 110-3 receives satellite signals 312-2, calculates (not shown) one or more performance metrics 336, determines (not shown) it is a synchronization mater and provides information 334 that specifying that radio node 110-2 is the synchronization master and the one or more performance metrics 336, computer 124 may assign 338 radio node 110-3 as the synchronization master for radio node 110-1 based on information and one or more performance metrics received from radio node 110-3 (not shown) and/or network information. Next, computer 124 may provide information 340 that indicates or specifies the assignment to radio node 110-1, along with a network address of radio node 110-3. This information may be received by interface circuit 314 in radio node 110-1.

Subsequently, interface circuit 314 provides a synchronization request 342 to radio node 110-3. After receiving synchronization request 342, radio node 110-3 may provide synchronization information 344 for radio node 110-1, where the synchronization information specifies time of day, frequency, and phase synchronization for at least the cluster.

In an exemplary embodiment, the communication technique is used to provide small-cell timing and frequency synchronization. Typically, an LTE small cell requires an eNodeB to maintain frequency and timing stability. In particular, frequency stability is usually required for time-division duplex ('TDD') and frequency-division duplex systems for call initiation and mobility services. Moreover, frequency stability may ensure that user equipment (such as cellular telephones) can communicate properly with the eNodeB without signal quality degradation. Furthermore, small-cell synchronization with the cellular-telephone network (such as macrocells) is typically needed for handover capability.

TDD systems also usually require timing and phase stability. In a TDD system, if the frame timing of neighboring eNodeBs is not synchronized, then the user equipment and the eNodeBs may interfere with each other. Furthermore, features, such as a multicast-broadcast single-frequency network (MBSFN), co-operative multipoint systems (COMPs) and enhanced inter-cell interference coordination (eICIC), also usually require timing and phase synchronization.

Frequency synchronization and start of radio frame phase synchronization requirements requirements for existing communication protocols and services are summarized in Table 1.

TABLE 1

| Protocol | Frequency Synchronization Requirement (ppb) | Start of Radio Frame Phase Synchronization Requirement (µs) | Notes |
| --- | --- | --- | --- |
| LTE (FDD) | 100/200 | — | Call initiation and basic mobility services |
| LTE (TDD) | 100/200 | ±1.5 | Time-slot alignment |
| LTE (MBSFN) | 100/200 | ±1.32 | Time alignment of video signals from multiple base stations |

TABLE 1-continued

| Protocol | Frequency Synchronization Requirement (ppb) | Start of Radio Frame Phase Synchronization Requirement (µs) | Notes |
|---|---|---|---|
| LTE (eICIC) | 100/200 | ±0.5 | Co-ordination of signals across eNBs |

In some embodiments, computer 124 in FIG. 1 selects one or more synchronization masters using a sorting technique. For example, radio nodes 110 may individually determine whether they meet one or more performance criteria, such as a signal-to-noise ratio greater than a threshold, e.g., of 12 dBm and a number of a number of satellites from which satellite signals are received greater than another threshold value, e.g., three satellites. These radio nodes may report the one or more performance metrics and/or whether or radio nodes 110 determined that they could be the synchronization master. Computer 124 may sort radio nodes 110 having a number of satellites from which satellite signals are received that is greater than the other threshold based on their average signal-to-noise ratio over a time interval, e.g., 5 min, to dynamically determine a ranking. Moreover, computer 124 may filter these signal-to-noise values, such as by computing the average signal-to-noise ratio over another time interval, e.g., 24 hours. Signal-to-noise ratio measurements older than 24 hours may be discarded. Next, computer 124 may select the synchronization master(s) based on the sorted ranking. For example, the radio node having the largest filtered signal-to-noise ratio and a number of a number of satellites from which satellite signals are received greater than another threshold value may be designated the synchronization master (when there is one synchronization master). Similarly, when there are multiple synchronization masters or a backup synchronization master, these other radio nodes may be dynamically selected based on the sorted ranking.

We now describe embodiments of an electronic device, which may perform at least some of the operations in the communication technique. FIG. 4 presents a block diagram illustrating an example of an electronic device 400 in accordance with some embodiments, such as one of radio nodes 110, electronic device 112 or computer 124. This electronic device includes processing subsystem 410, memory subsystem 412, and networking subsystem 414. Processing subsystem 410 includes one or more devices configured to perform computational operations. For example, processing subsystem 410 can include one or more microprocessors, graphics processing units (GPUs), ASICs, microcontrollers, programmable-logic devices, and/or one or more digital signal processors (DSPs).

Memory subsystem 412 includes one or more devices for storing data and/or instructions for processing subsystem 410 and networking subsystem 414. For example, memory subsystem 412 can include dynamic random access memory (DRAM), static random access memory (SRAM), and/or other types of memory. In some embodiments, instructions for processing subsystem 410 in memory subsystem 412 include: one or more program modules or sets of instructions (such as program module 422 or operating system 424), which may be executed by processing subsystem 410. Note that the one or more computer programs or program modules may constitute a computer-program mechanism. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing sub system 410.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Networking subsystem 414 includes one or more devices configured to couple to and communicate on a wired and/or wireless network (i.e., to perform network operations), including: control logic 416, an interface circuit 418 and one or more antennas 420 (or antenna elements). (While FIG. 4 includes one or more antennas 420, in some embodiments electronic device 400 includes one or more nodes, such as antenna nodes 408, e.g., a pad, which can be coupled to the one or more antennas 420, or nodes 406, which can be coupled to a wired or optical connection or link. Thus, electronic device 400 may or may not include the one or more antennas 420. Note that the one or more nodes 406 and/or antenna nodes 408 may constitute input(s) to and/or output(s) from electronic device 400.) For example, networking subsystem 414 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 400 may be adapted or changed using pattern shapers (such as reflectors) in one or more antennas 420 (or antenna elements), which can be independently and selectively electrically coupled to ground to steer the transmit antenna pattern in different directions. Thus, if one or more antennas 420 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3dB or lower than the peak gain of the given antenna pattern. Thus, the given antenna pattern may include a local maximum (e.g., a primary beam) that directs gain in the direction of electronic device 400 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 400 may use the mechanisms in networking subsystem 414 for performing simple wireless communication between the electronic devices, e.g., transmitting advertising or beacon frames and/or scanning for advertising frames transmitted by other electronic devices as described previously.

Within electronic device 400, processing subsystem 410, memory subsystem 412, and networking subsystem 414 are coupled together using bus 428. Bus 428 may include an electrical, optical, and/or electro-optical connection that the subsystems can use to communicate commands and data among one another. Although only one bus 428 is shown for clarity, different embodiments can include a different number or configuration of electrical, optical, and/or electro-optical connections among the subsystems.

In some embodiments, electronic device 400 includes a display subsystem 426 for displaying information on a display, which may include a display driver and the display, such as a liquid-crystal display, a multi-touch touchscreen, etc.

Electronic device 400 can be (or can be included in) any electronic device with at least one network interface. For example, electronic device 400 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an eNodeB, a controller, test equipment, and/or another electronic device.

Although specific components are used to describe electronic device 400, in alternative embodiments, different components and/or subsystems may be present in electronic device 400. For example, electronic device 400 may include one or more additional processing subsystems, memory subsystems, networking subsystems, and/or display subsystems. Additionally, one or more of the subsystems may not be present in electronic device 400. Moreover, in some embodiments, electronic device 400 may include one or more additional subsystems that are not shown in FIG. 4. Also, although separate subsystems are shown in FIG. 4, in some embodiments some or all of a given subsystem or component can be integrated into one or more of the other subsystems or component(s) in electronic device 400. For example, in some embodiments program module 422 is included in operating system 424 and/or control logic 416 is included in interface circuit 418.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 414. The integrated circuit may include hardware and/or software mechanisms that are used for transmitting wireless signals from electronic device 400 and receiving signals at electronic device 400 from other electronic devices. Aside from the mechanisms herein described, radios are generally known in the art and hence are not described in detail. In general, networking subsystem 414 and/or the integrated circuit can include any number of radios. Note that the radios in multiple-radio embodiments function in a similar way to the described single-radio embodiments.

In some embodiments, networking subsystem 414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and an LTE communication protocol as an illustrative example, in other embodiments a wide variety of communication protocols and, more generally, wireless communication techniques may be used. For example, instead of Ethernet, a communication protocol that is compatible with the Internet Protocol is used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 422, operating system 424 (such as a driver for interface circuit 418) or in firmware in interface circuit 418. Thus, the communication technique may be implemented at runtime of program module 422. Alternatively or additionally, at least some of the operations in the communication technique may be implemented in a physical layer, such as hardware in interface circuit 418.

While selection of the synchronization master(s) and slaves may be based on the received GPS signals as described previously, in some embodiments the slaves may use network listen (NL) to synchronize with a synchronization master. In particular, a radio node may listen to wireless signals from one or more base stations or macrocells in a cellular-telephone network. (Note that a NL to one or more macrocells can provide a frequency accuracy of a few parts per billion.) In these embodiments, because PTP may not be used, the notions of 'synchronization master' and 'slave' may no longer be valid. Instead, the roles of the 'synchronization master' and 'slave' may be similar, and the synchronization information may be provided by the one or more base stations.

In some embodiments, separately or in addition to the GPS signals, a radio node may measure wireless or electrical signals corresponding to another wireless communication system (such as a cellular-telephone network) with an accurate on-board timing source or reference. Then, the radio node may repeat other operations in the communication technique, such as calculating one or more performance metrics based on the electrical signals, determining, based on the one or more performance metrics, whether the radio node is a synchronization master, etc. Note that the wireless signals corresponding to the other wireless communication system may be in the same frequency band(s) or different frequency band(s) as the GPS signals.

While examples of numerical values are provided in the preceding discussion, in other embodiments different numerical values are used. Consequently, the numerical values provided are not intended to be limiting.

While the preceding embodiments illustrated the use of the communication technique with GPS signals between 1-1.5 GHz, in other embodiments of the communication technique different wireless signals and/or different frequency band(s) may be used. For example, the wireless signals may be communicated in one or more bands of frequencies, including: 900 MHz, 2.4 GHz, 3.5 GHz, 5 GHz, 60 GHz, and/or a band of frequencies used by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer, comprising:
   one or more wired nodes; and
   an interface circuit communicatively coupled to the one or more wired nodes, wherein the computer is configured to:
      receive, at the interface circuit, information associated with one or more candidate radio nodes in a cluster of radio nodes, wherein the information associated with a given candidate radio node in the one or more candidate radio nodes specifies that the given candidate radio node meets one or more synchronization master criteria and the information comprises one or more performance metrics corresponding to satellite signals or wireless signals, wherein the satellite signals are associated with a global positioning system and the wireless signals are associated with a cellular-telephone network;
      select, based at least in part on the one or more performance metrics of the one or more candidate radio nodes and network information, a radio node in the one or more candidate radio nodes as a synchronization master for at least a subset of the radio nodes in a remainder of the radio nodes in the cluster of radio nodes, wherein the remainder of the radio nodes do not meet the one or more synchronization criteria; and
      provide, from the interface circuit and addressed to at least the subset of the radio nodes, second information specifying the radio node as the synchronization master, wherein the second information comprises a network address of the synchronization master, and
   wherein the computer does not provide, to the radio node, identifiers of at least the subset of the radio nodes.

2. The computer of claim 1, wherein the one or more performance metrics comprise one or more of: an average received signal strength, a number of satellites from which the given radio node receives the satellite signals, and a signal-to-noise ratio.

3. The computer of claim 1, wherein the network information comprises a number of radio nodes in the remainder of the radio nodes.

4. The computer of claim 1, wherein the information specifies two or more candidate radio nodes, and the computer is configured to:
   select multiple synchronization masters for the remainder of the radio nodes; and
   assign radio nodes in the remainder of the radio nodes to the synchronization masters.

5. The computer of claim 4, wherein the assigning comprises randomly and approximately equally assigning the radio nodes in the remainder of the radio nodes to the synchronization masters.

6. The computer of claim 1, wherein the second information specifies a second radio node in the one or more candidate radio nodes as a backup synchronization master for the radio node; and
   wherein the second information comprises a second network address of the backup synchronization master.

7. The computer of claim 1, wherein the information specifies two or more candidate radio nodes;
   wherein the computer is configured to select a second radio node in the one or more candidate radio nodes as a second synchronization master for at least the subset of the radio nodes; and
   wherein the second information specifies the second radio node as the second synchronization master and the second information comprises a second network address of the second synchronization master.

8. The computer of claim 1, wherein the information specifies two or more candidate radio nodes; and
wherein selecting the radio node as the synchronization master comprises sorting the two or more candidate radio nodes based at least in part on a dynamic ranking of the one or more performance metrics associated with the two or more candidate radio nodes.

9. The computer of claim 1, wherein the one or more synchronization master criteria comprise when one of: a number of satellites from which the given radio node receives the satellite signals is greater than a first threshold value, and the signal-to-noise ratio is greater than a second threshold value.

10. The computer of claim 1, wherein the cluster of radio nodes comprise eNodeBs.

11. A non-transitory computer-readable storage medium for use in conjunction with a computer, the computer-readable storage medium storing program instructions that, when executed by the computer, provide second information by causing the computer to perform one or more operations comprising:
receiving information associated with one or more candidate radio nodes in a cluster of radio nodes, wherein the information associated with a given candidate radio node in the one or more candidate radio nodes specifies that the given candidate radio node meets one or more synchronization master criteria and the information comprises one or more performance metrics corresponding to satellite signals or wireless signals, wherein the satellite signals are associated with a global positioning system and the wireless signals that are associated with a cellular-telephone network;
selecting, based at least in part on the one or more performance metrics of the one or more candidate radio nodes and network information, a radio node in the one or more candidate radio nodes as a synchronization master for at least a subset of the radio nodes in a remainder of the radio nodes in the cluster of radio nodes, wherein the remainder of the radio nodes do not meet the one or more synchronization criteria; and
providing, addressed to at least the subset of the radio nodes, the second information specifying the radio node as the synchronization master, wherein the second information comprises a network address of the synchronization master, and
wherein the computer does not provide, to the radio node, identifiers of at least the subset of the radio nodes.

12. The computer-readable storage medium of claim 11, wherein the one or more performance metrics include one or more of: an average received signal strength, a number of satellites from which the given radio node receives the satellite signals, and a signal-to-noise ratio.

13. The computer-readable storage medium of claim 11, wherein the second information specifies a second radio node in the one or more candidate radio nodes as a backup synchronization master for the radio node; and
wherein the second information comprises a second network address of the backup synchronization master.

14. The computer-readable storage medium of claim 11, wherein the information specifies two or more candidate radio nodes;
wherein the one or more operations comprise selecting a second radio node in the one or more candidate radio nodes as a second synchronization master for at least the subset of the radio nodes; and
wherein the second information specifies the second radio node as the second synchronization master and the second information comprises a second network address of the second synchronization master.

15. The computer-readable storage medium of claim 11, wherein the information specifies two or more candidate radio nodes; and
wherein selecting the radio node as the synchronization master comprises sorting the two or more candidate radio nodes based at least in part on a dynamic ranking of the one or more performance metrics associated with the two or more candidate radio nodes.

16. A method for providing second information, comprising:
by a computer:
receiving information associated with one or more candidate radio nodes in a cluster of radio nodes, wherein the information associated with a given candidate radio node in the one or more candidate radio nodes specifies that the given candidate radio node meets one or more synchronization master criteria and the information comprises one or more performance metrics corresponding to satellite signals or wireless signals, wherein the satellite signals are associated with a global positioning system and the wireless signals are associated with a cellular-telephone network;
selecting, based at least in part on the one or more performance metrics of the one or more candidate radio nodes and network information, a radio node in the one or more candidate radio nodes as a synchronization master for at least a subset of the radio nodes in a remainder of the radio nodes in the cluster of radio nodes, wherein the remainder of the radio nodes do not meet the one or more synchronization criteria; and
providing, addressed to at least the subset of the radio nodes, the second information specifying the radio node as the synchronization master, wherein the second information comprises a network address of the synchronization master, and
wherein the computer does not does not provide, to the radio node, identifiers of at least the subset of the radio nodes.

17. The method of claim 16, wherein the one or more performance metrics include one or more of: an average received signal strength, a number of satellites from which the given radio node receives the satellite signals, and a signal-to-noise ratio.

18. The method of claim 16, wherein the second information specifies a second radio node in the one or more candidate radio nodes as a backup synchronization master for the radio node; and
wherein the second information comprises a second network address of the backup synchronization master.

19. The method of claim 16, wherein the information specifies two or more candidate radio nodes;
wherein the one or more operations comprise selecting a second radio node in the one or more candidate radio nodes as a second synchronization master for at least the subset of the radio nodes; and
wherein the second information specifies the second radio node as the second synchronization master and the second information comprises a second network address of the second synchronization master.

20. The method of claim 16, wherein the information specifies two or more candidate radio nodes; and
wherein selecting the radio node as the synchronization master comprises sorting the two or more candidate radio nodes based at least in part on a dynamic ranking of the one or more performance metrics associated with the two or more candidate radio nodes.

\* \* \* \* \*

UNITED STATES PATENT AND TRADEMARK OFFICE
CERTIFICATE OF CORRECTION

| | |
|---|---|
| PATENT NO. | : 11,363,553 B2 |
| APPLICATION NO. | : 16/897553 |
| DATED | : June 14, 2022 |
| INVENTOR(S) | : Petrus et al. |

It is certified that error appears in the above-identified patent and that said Letters Patent is hereby corrected as shown below:

In the Claims

Column 20, Line 42, Claim 16: Please correct "does not does not" to read --does not--

Signed and Sealed this
Twenty-second Day of November, 2022

Katherine Kelly Vidal
*Director of the United States Patent and Trademark Office*